(12) United States Patent
Horovitz

(10) Patent No.: US 7,593,976 B1
(45) Date of Patent: Sep. 22, 2009

(54) METHOD AND APPARATUS FOR FINDING THE NEXT FREE BIT IN A REGISTER

(75) Inventor: Sorel Horovitz, Nes Ziona (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 970 days.

(21) Appl. No.: 10/678,523

(22) Filed: Oct. 3, 2003

Related U.S. Application Data

(60) Provisional application No. 60/438,258, filed on Jan. 6, 2003, provisional application No. 60/468,004, filed on May 5, 2003.

(51) Int. Cl.
G06F 7/00 (2006.01)

(52) U.S. Cl. ....................................... 708/200

(58) Field of Classification Search ......... 708/200–211, 708/520
See application file for complete search history.

(56) References Cited

U.S. PATENT DOCUMENTS

| 4,028,667 | A | * | 6/1977 | Breslau et al. | ............... 709/225 |
| 5,091,874 | A | * | 2/1992 | Watanabe et al. | ........... 708/211 |
| 5,497,496 | A | | 3/1996 | Ando | |
| 5,568,410 | A | * | 10/1996 | Bechade | ...................... 708/211 |
| 5,615,020 | A | * | 3/1997 | Keith | ........................... 382/246 |
| 5,696,992 | A | * | 12/1997 | Matsuda | ...................... 710/53 |
| 5,913,042 | A | | 6/1999 | Shemla et al. | |
| 6,240,065 | B1 | | 5/2001 | Medina et al. | |
| 6,460,130 | B1 | | 10/2002 | Trull et al. | |
| 6,477,552 | B1 | * | 11/2002 | Ott | .............................. 708/211 |
| 6,542,987 | B1 | | 4/2003 | Fischer et al. | |
| 6,609,189 | B1 | * | 8/2003 | Kuszmaul et al. | .............. 712/23 |
| 6,697,828 | B1 | * | 2/2004 | Ott | .............................. 708/211 |
| 6,779,008 | B1 | * | 8/2004 | Erle et al. | .................... 708/211 |

* cited by examiner

Primary Examiner—Chat C Do

(57) ABSTRACT

The present invention provides a method and apparatus for finding the next free bit in a register, starting from a known pointer. The present invention breaks the N bits of a vector in a register into M parts, performs an AND operation to all bits of each part respectively, and uses the operation result for each part as a bit to generate a check sector. It is then decided whether the register has a free bit by performing an AND operation to all bits of the check sector. If the result is 1, the register is full. Otherwise, the next free bit is found by looking for a forward free bit from the pointed-to bit until the end of the pointed-to part; a forward available part, having a free bit, from the pointed-to part until the end of the register; and an available part, having a free bit, from the beginning of the register. The present invention also searches the parts to locate the free bit therein.

14 Claims, 7 Drawing Sheets

METHOD AND APPARATUS FOR FINDING THE NEXT FREE BIT IN A REGISTER

CROSS-REFERENCE TO RELATED APPLICATIONS

This application claims the benefit of Provisional Application No. 60/438,258, filed Jan. 6, 2003, and Provisional Application No. 60/468,004, filed May 5, 2003. This application incorporates these provisional applications by reference.

BACKGROUND OF THE INVENTION

The present invention relates to register management, and more specifically to finding a free bit in a register efficiently.

Conventional methods employ a Round Robin approach to find an empty bit in a register. For a three bit register, for example, one conventional method first starts at bit 0, and decides which is the next free bit, bit 0, bit 1, or bit 2. The method then starts at bit 1, and decides which is the next free bit, bit 1, bit 2 or bit 0. Finally, bit 2 is regarded as the starting bit, and it is decided which is the next free bit, bit 2, bit 0, or bit 1. As the number of bits of a register increases, the processing time and the number of gates and method steps needed for the conventional method increase dramatically, even when the starting bit is known.

It would be advantageous to provide a method and apparatus for more efficiently locating the next free bit in a register.

SUMMARY OF THE INVENTION

It is an object of the present invention to provide an apparatus for finding the next free bit in a register, starting from a known pointer. The apparatus of the present invention may employ hardware which includes a vector breaker, a first AND operator, a second AND operator, a forward free bit finder, a forward available part finder, an available part finder, a plurality of free bit finders, a plurality of encoders, and a decision unit. Various types of hardware are capable of performing the functions which these various elements perform.

The vector breaker breaks a vector of N bits in the register into M parts. The first AND operator performs an AND operation on all bits of each part respectively, and uses the operation result for each part as a bit of a check sector. The second AND operator performs an AND operation on all bits of the check sector. If the result is 1, the register is full. The forward free bit finder locates the next free bit from the bit that is being pointed to by a pointer until the end of the part that the pointer is pointing to. The forward available part finder locates the next part, having a free bit, from the pointed-to part to the end of the register. The available part finder locates a part, having a free bit, from the beginning of the register. The free bit finder locates a free bit from the beginning of a part. The decision unit decides the next free bit according to inputs.

It is another object of the present invention to provide a method for finding the next free bit in a register, starting from a known pointer. The method of the present invention breaks the N bits of a vector in the register into M parts, performs an AND operation on all bits of each part respectively, and uses the operation result for each part as a bit to generate a check sector. It is then decided whether the register has a free bit by performing an AND operation to all bits of the check sector. If the result is 1, the register is full. Otherwise, the present invention finds the next free bit by looking for a forward free bit from the bit that is being pointed to until the end of the part being pointed to; a forward available part, having a free bit, from the pointed-to part until the end of the register; and an available part, having a free bit, from the beginning of the register. The present invention also searches the parts to locate the free bit therein.

BRIEF DESCRIPTION OF THE DRAWINGS

The present invention is described herein with reference to the accompanying drawings, similar reference numbers being used to indicate functionally similar elements.

DETAILED DESCRIPTION OF EMBODIMENTS

Objects and advantages of the present invention will become apparent from the following detailed description.

Figure 1A:
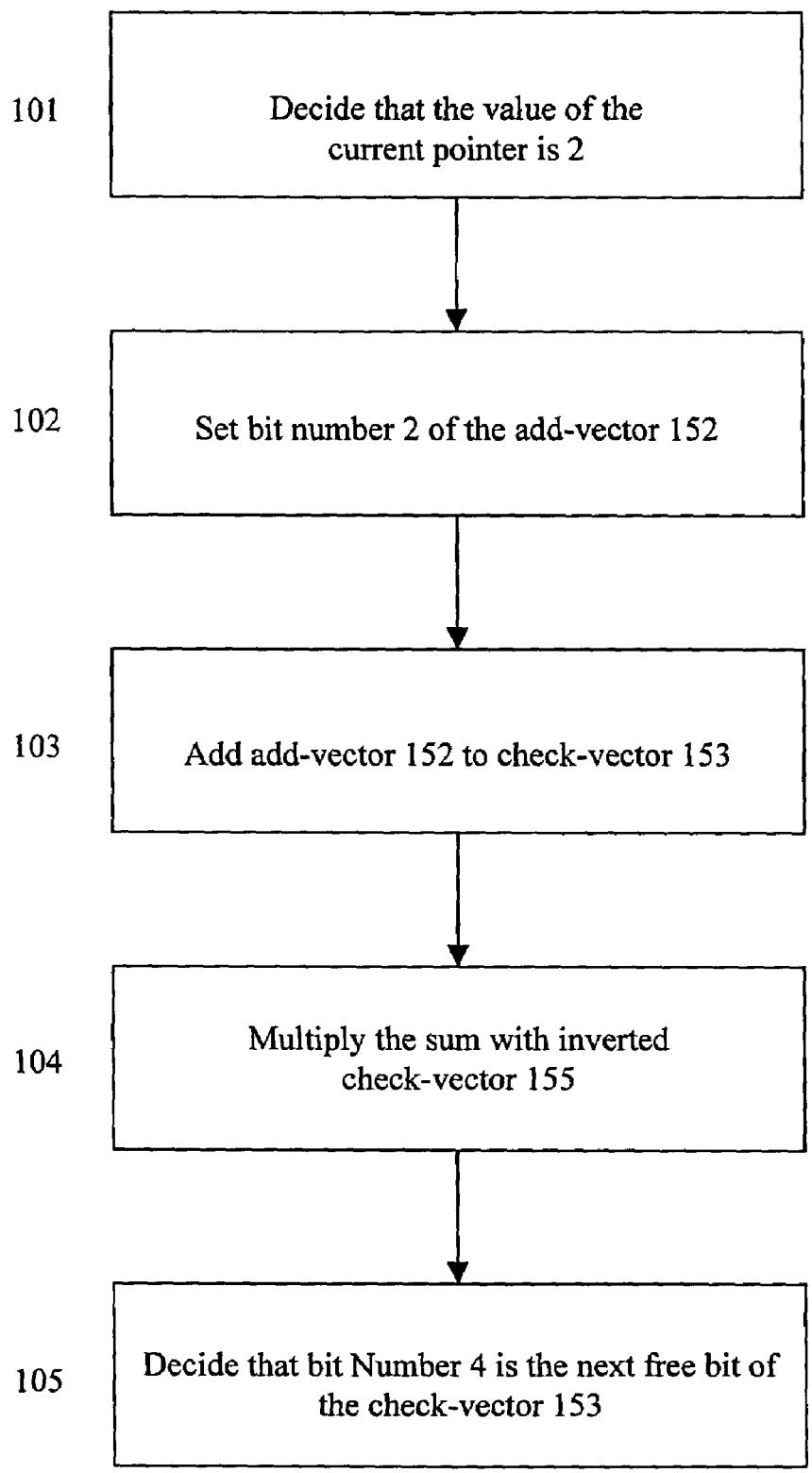
FIGS. 1*a* and *b* show a flow chart and bit status of a method for finding the next free bit in an eight-bit register according to one embodiment of the present invention.
Figure 1B:
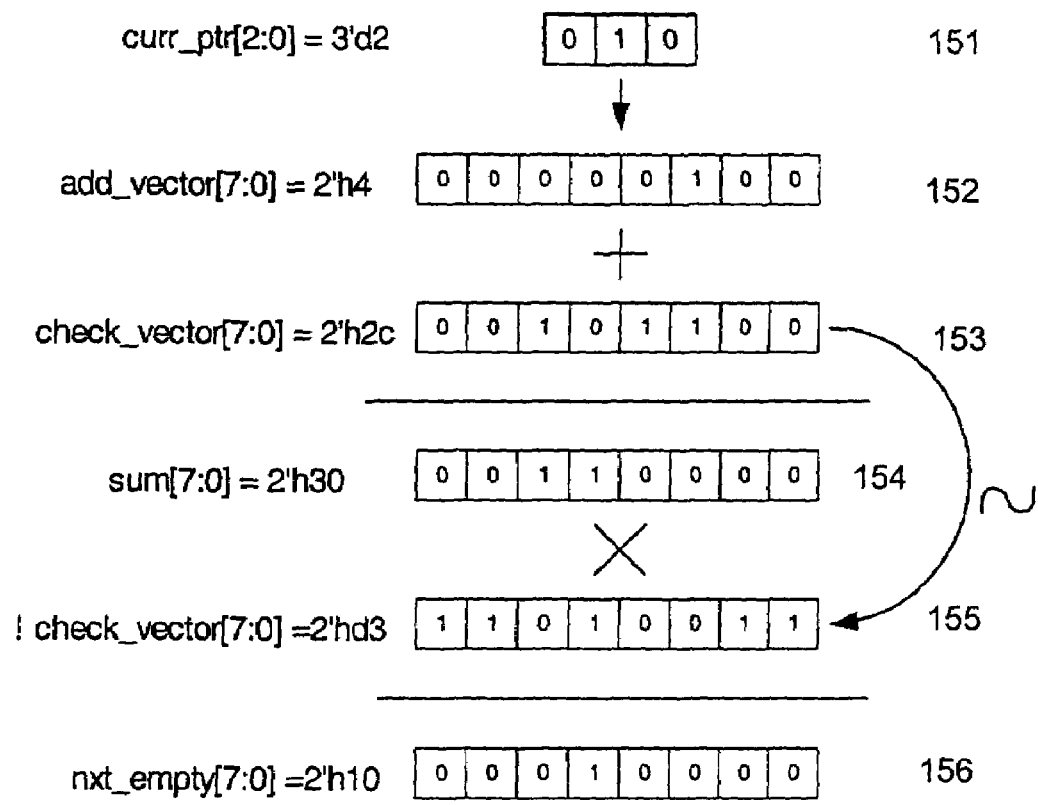

FIGS. 1*a* and 1*b* show a flow chart and bit status of a method for finding the next free bit in an eight-bit register according to one embodiment of the present invention.

As shown in FIG. 1*b*, a current pointer 151 in this embodiment is 010. A check vector 153, in which the next free bit is to be located, is 00101100. Because the current pointer is pointing to the second bit of the check vector, the method shown in FIG. 1*a* may be used to locate the next free bit on the left of the second bit. In this embodiment, the current pointer has 3 bits, and the check vector has 8 bits. However, it should be understood that, for purpose of the invention, the specific number of bits of the current pointer and the check vector are not critical, and could be different from those in this embodiment. For example, the apparatus shown in FIG. 2 is used to find the next free bit in a 128 bit register with a 7 bit current pointer.

At step 101, it is determined that the value of the current pointer 151, as shown in FIG. 1*b*, is 2. At step 102, the bit number 2 of an add vector 152 is set, as shown in FIG. 1*b*. In this embodiment, the bit of the add vector corresponding to the value of the current pointer is set. At step 103, the add vector 152 is added to the check vector 153, obtaining a sum 154. At step 104, the sum 154 is multiplied with the inverted check vector 155, i.e., 11010011. Bit number 4 of the product 156 is 1, indicating the bit number 4 of the check vector 153 is the next free bit on the left of bit number 2 of the check vector.

Figure 2:
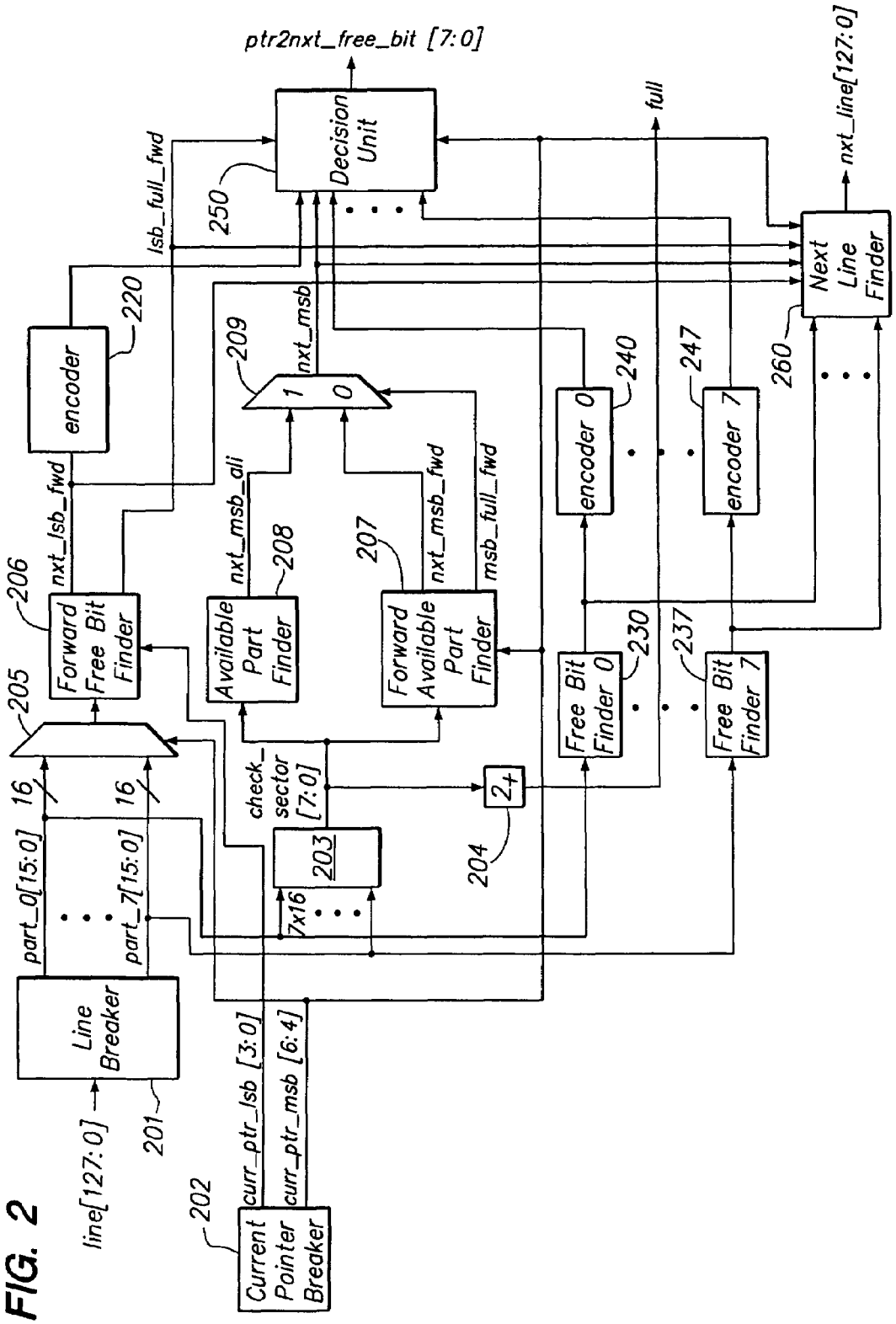
FIG. 2 shows a block diagram of an apparatus for finding the next free bit in a register according to one embodiment of the present invention.

FIG. 2 shows a block diagram of an apparatus for finding the next free bit in a register according to one embodiment of the present invention. The register in this embodiment has 128 bits, and the current pointer has 7 bits. It should be understood that the present invention can be applied to a register with any number of bits, and the bits can be broken up in various different ways.

In one embodiment, a vector breaker 201 breaks the 128 bits of the register into 8 parts, i.e., part 0 to part 7. Each of the 8 parts has 16 bits, i.e., bit number 0 to bit number 15.

A current pointer breaker 202 breaks the 7 bits of the current pointer into two sections: current pointer msb, comprising the upper 3 bits of the current pointer, bit number 4 to bit number 6; and current pointer lsb, comprising the lower 4 bits of the current pointer, bit number 0 to bit number 3. Accordingly, current pointer msb has a value ranging from 0 to 7, and indicates the particular 16 bit part pointed to by the current pointer. The current pointer lsb has a value ranging from 0 to 15, and indicates the bit in the particular 16 bit part to which the current pointer points.

Each of the eight inputs of an AND operator 203 receives a 16 bit part from an output of the vector breaker 201. The AND operator 203 performs an AND operation on the 16 bit of each part respectively. If the result of an AND operation for the bits of a 16 bit part is "1", that particular part is full. If the result is "0", that part has at least one free bit. The AND operator 203 outputs an eight bit check sector. The value of bit number 0 of the check sector is the result of the AND operation of the 16 bits of part 0, and the value of bit number 1 of the check sector is the result of the AND operation of the 16 bits of part 1, etc.

An AND operator 204 performs an AND operation on the 8 bits of the check sector. If the result is 1, the 128 bit register is full. If the result is 0, the 128 bit register has at least one free bit.

Each of the eight inputs of a port selector 205 receives a 16 bit part from an output of the vector breaker 201. The port selector 205 selects one of these parts according to the value of the current pointer msb from the current pointer breaker 202, and outputs this part to a forward free bit finder 206. Accordingly, the 16 bit part to which the bit pointed to by the current pointer belongs is sent to the forward free bit finder 206.

The forward free bit finder 206 performs the operation shown in FIG. 1a to the 16 bit part from the port selector 205. Here, the 16 bit part corresponds to the check vector 153 shown in FIG. 1a, and the current pointer lsb corresponds to the current pointer 151 shown in FIG. 1a. If there is no free bit on the left of the bit pointed to by the current pointer in the 16 bit part, the lsb_full_forward signal rises, informing a decision unit 250 that the pointed-to part does not have a free bit. Otherwise, the forward free bit finder 206 outputs a nxt_lsb_fwd signal, informing an encoder 220 the next free bit in the register. The encoder 220 transforms the nxt_lsb_fwd signal from 16 bits to 4 bits.

A forward available part finder 207 receives the check sector from the add operator 203, and performs the operation shown in FIG. 1a to the check sector. Here, the 8 bit check sector corresponds to the check vector 153 shown in FIG. 1a, and the current pointer msb corresponds to the current pointer 151 shown in FIG. 1a. If there is no free bit on the left of the bit pointed to by the current pointer msb in the check sector, the signal msb_full_forward rises. Otherwise, the forward available part finder 207 outputs a nxt_msb_fwd signal, indicating the next free bit from the bit of the check sector pointed to by current pointer msb until the end of the check sector. Because each bit of the check sector indicates whether a 16 bit part of the register has a free bit, the nxt_msb_fwd signal actually indicates the next available part of the 128 bit register that has a free bit.

An available part finder 208 receives the check sector from the add operator 203, and performs the operation shown in FIG. 1a to the check sector. Here, the 8 bit check sector corresponds to the check vector 153 shown in FIG. 1a. The current pointer starts from 0, so the add vector is 00000001, with its bit number 0 set. The available part finder 208 outputs a nxt_msb_all signal, indicating the first free bit in the check sector. Again, because each bit of the check sector indicates whether a 16 bit part has a free bit, the nxt_msb_all signal actually indicates the first 16 bit part of the 128 bit register that has a free bit.

A port selector 209 receives the msb_full_fwd signal from the forward free bit finder 207 as a control signal. When the msb_full_fwd signal indicates that there is a forward free part, the port selector sends the nxt_msb_fwd signal from the forward free bit finder 207 to the decision unit 250. Otherwise, the port selector 209 sends the nxt_msb_all from the available part finder 208 to the decision unit 250.

Each of the eight free bit finders 230 to 237 receives a 16 bit part from an output of the vector breaker 201, and performs the operation shown in FIG. 1a to the 16 bit part to find the first free bit in that part. For example, the free bit finder 230 receives part 0 from the vector breaker 201. Part 0 corresponds to the check vector 153 shown in FIG. 1a. The current pointer starts from 0, so the add vector is 16'h01, with its bit number 0 set. Accordingly, the free bit finder 230 finds out the first free bit in part 0.

Each of the eight free bit finders 230 to 237 outputs its operation result to one of the eight encoders 240 to 247. The encoder transforms the operation result of the free bit finder from 16 bits to 4 bits.

A decision unit 250 receives signals from the encoders 220 and 240 to 247, the forward free bit finder 206, the port selector 209, and current pointer breaker 202, decides the next free bit in the 128 bit register, and moves the current pointer to the found free bit.

A next vector finder receives signals from free bit finders 230 to 237, the port selector 209, the forward free bit finder 206, and current pointer breaker 202, and outputs a new vector with the found free bit masked.

Figure 3:
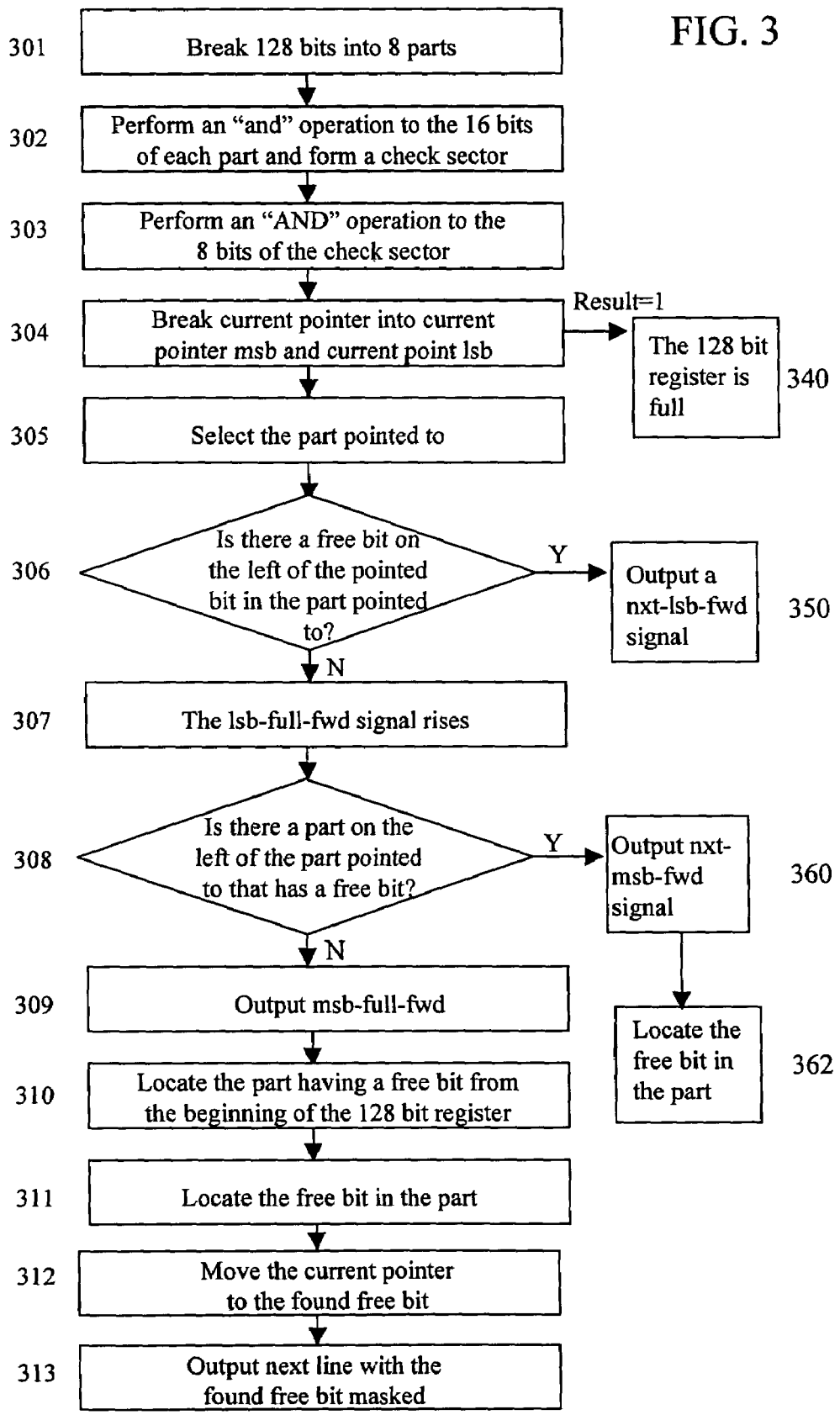
FIG. 3 shows a flow chart of a method for finding the next free bit in a register according to one embodiment of the present invention, using the apparatus shown in FIG. 2.

FIG. 3 shows a flow chart of a method for finding the next free bit of a register according to one embodiment of the present invention, using the apparatus shown in FIG. 2.

At step 301, the 128 bits of the register are broken into 8 parts, parts 0 to 7, by the vector breaker 201. Each of the 8 parts has 16 bits, bits 0 to 15.

At step 302, the AND operator 203 performs an AND operation on the 16 bits of each part, and outputs the 8 bits check sector. As described above, each bit of the check sector is the result of the AND operation of the 16 bits of a part.

At step 303, the AND operator 204 performs an AND operation on the 8 bits of the check sector. If the result of the AND operation is 1, the process goes to step 340, and indicates that the 128 bit register is full.

If the 128 bit register is not full, at step 304, the current pointer is broken into two sections: current pointer msb and current pointer lsb. The current pointer msb indicates the part pointed to by the current pointer, and the current pointer lsb indicates the bit pointed to by the current pointer.

At step 305, the port selector 205 selects the pointed-to part from the outputs of the vector breaker 201 according to current pointer msb.

At step 306, the forward free bit finder 206 finds the next free bit from the bits of the pointed-to part on the left of the pointed-to bit. If the forward free bit finder 206 finds such a free bit, it sends a nxt_lsb_fwd signal to the encoder 220 at step 350. Otherwise, the lsb_full_fwd signal rises at step 307, indicating that there is not a forward free bit.

At step 308, the forward available part finder 207 finds the next available part which has a free bit, from the part on the left of the pointed-to part until the end of the 128 bit register. If there is an available part, the forward available part finder 207 outputs the nxt_msb_fwd signal to the port selector 209 at step 360. At step 361, the free bit finder of the found available part locates the first free bit in the available part. If there is no such part, the forward free part finder 207 outputs the msb_full_fwd signal to the port selector 209 at step 309.

At step 310, the available part finder 208 finds an available part which has a free bit, from part 0 of the 128 bit register.

At step 311, the free bit finder of the part found at step 310 locates the first free bit in the part.

At step 312, the decision unit 250 moves the current pointer to the found free bit.

At step 313, the next vector finder 260 outputs a new vector with the found free bit masked.

Figure 4:
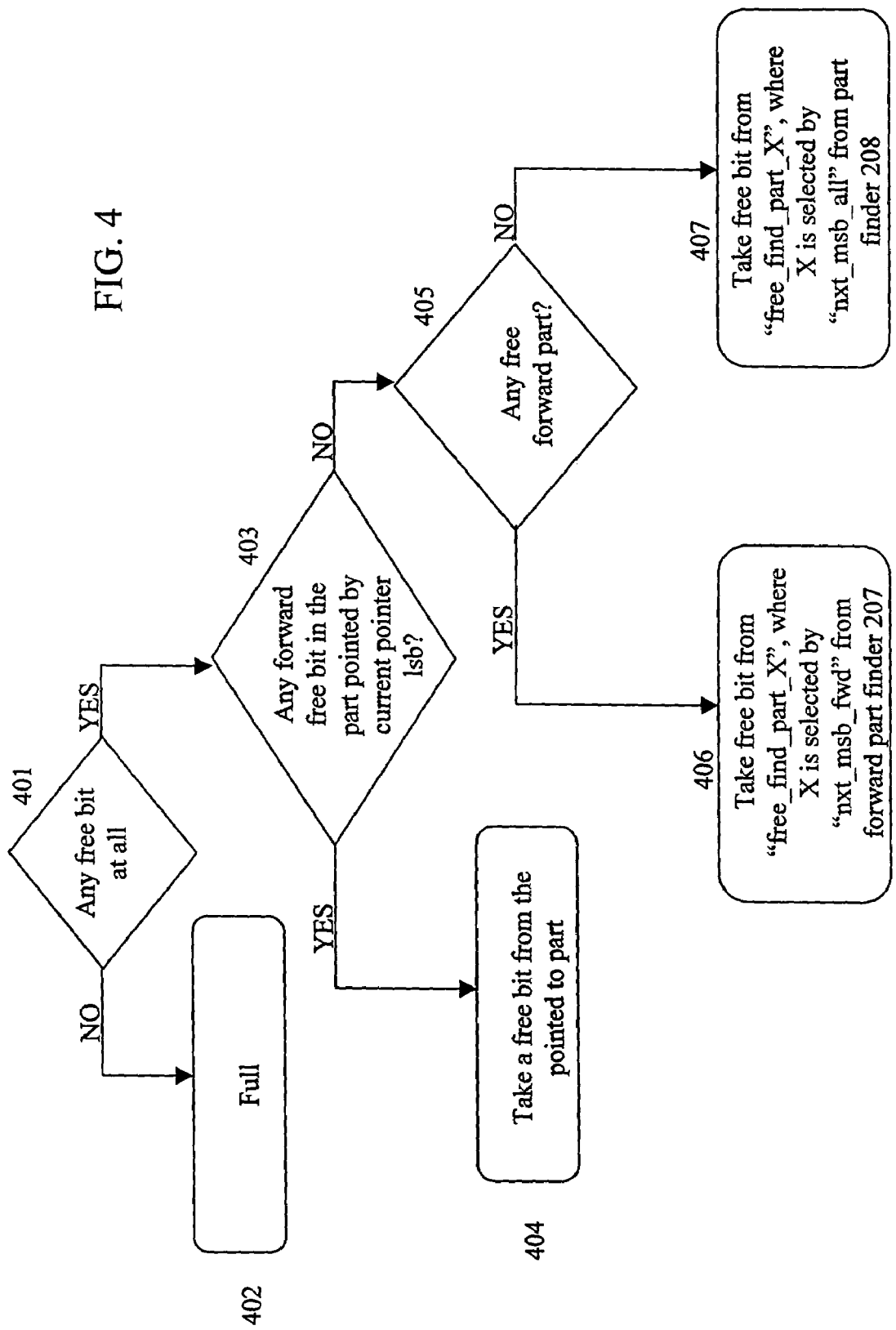
FIG. 4 is a simplified flow chart of the method shown in FIG. 3.

FIG. 4 is a simplified flow chart of the method shown in FIG. 3.

At step 402, it is decided whether a 128 bit register has a free bit at all, corresponding to step 303. If there is not free bit, it is indicated that the register is full, corresponding to step 340.

If the register has a free bit, it is decided at step 403 whether there is any forward free bit in the part pointed to by the current pointer msb, corresponding to step 306. If yes, the free bit is taken from the pointed-to part at step 404, corresponding to step 350.

If there is not forward free bit in the pointed-to part, it is decided at step 405 whether there is any available forward part that has a free bit, corresponding to step 308. If yes, the free bit is taken from the found forward part, corresponding to step 361.

If there is not an available forward part that has a free bit, it is decided which part, from the beginning of the register, has a free bit at step 407, corresponding to step 310. The free bit is then taken from that part.

Figure 5:
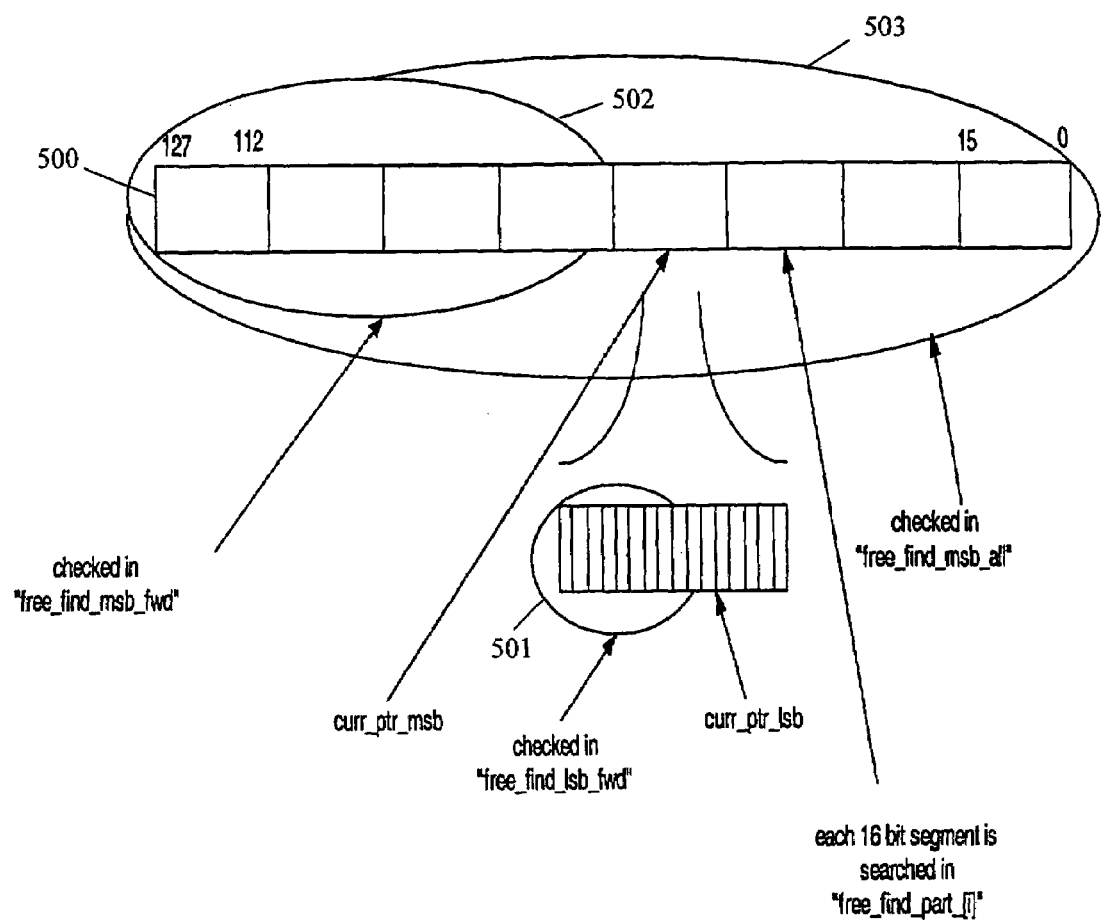
FIG. 5 is a diagram illustrating the operation of the method shown in FIG. 3.

FIG. 5 shows a diagram illustrating the operation of the method shown FIG. 3.

As shown, in this embodiment, the 128 bit register 500 is broken into 8 parts, each of which has 16 bits. Current pointer msb points to part 3 of the register, and current pointer lsb points to bit number 2 of part 3. The method starts with finding a forward free bit from bit number 3 to bit number 15 of part 3, shown as the small circle 501, and corresponding to step 306. If there is not a forward free bit in part 3, it is then decided whether there is a forward available part, which has a free bit, from part 4 to part 7, shown as the middle circle 502 and corresponding to step 308. If there is not a forward available part, it is decided which part of the register, from part 0, has a free bit. This step is shown as the big circle 503 and corresponding to step 310.

In the embodiment described above, the steps for finding the forward free bit, the forward available part, the available part and the free bit are performed one after another. However, it should be understood that these steps can be carried out in parallel, so as to further reduce the processing time.

The present invention significantly increases the efficiency for finding the next free bit in a register, and makes it possible to find the next free bit in one cycle.

The present invention could have many varieties. For example, the means and method steps for finding the forward free bit, the available forward part, and the available part can be used separated from each other.

Figure 6:
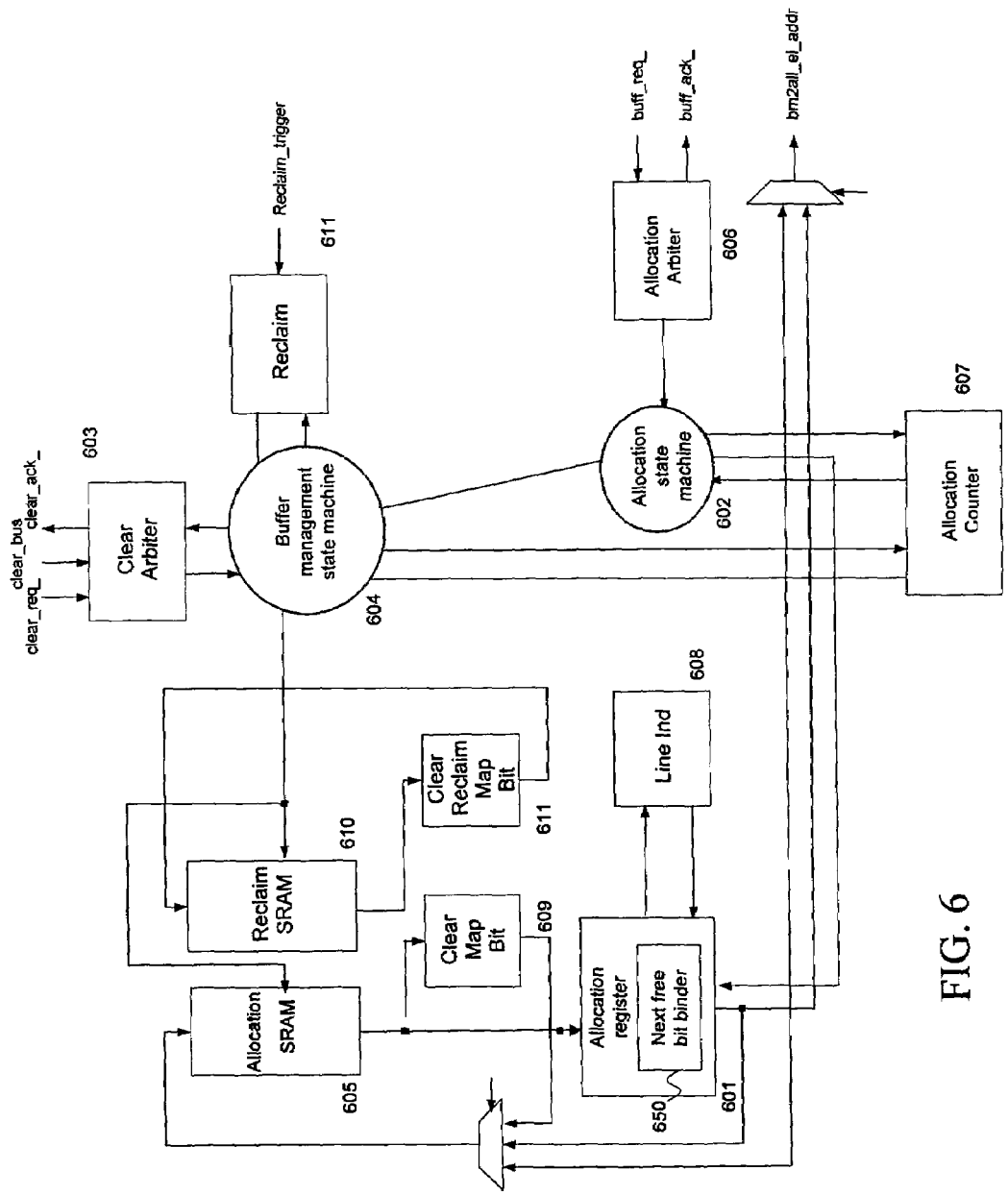
FIG. 6 shows a block diagram of a buffer management system incorporating the apparatus and method of the present invention.

FIG. 6 shows a block diagram of a buffer management system incorporating the apparatus and method of the present invention. When a new packet arrives, it is stored in memory until all decisions about the packet are made. The disclosed buffer management system provides buffers for storing an incoming packet. After the packet is transmitted, the buffer related to it is cleaned. The allocation is done for a 128 bit allocation register 601, in an incremental way, by finding the next empty buffer in the register. As shown, an allocation state machine 602 controls a free bit finder 650, the apparatus shown in FIG. 2. Specifically, the allocation state machine 602 sends a line change request to a buffer management state machine 604 when there is no empty bit in the current line, and sends a counter increment request when an allocation is done. A clear arbiter 603 clears the buffers in an allocation register 601 through the buffer management state machine 604. When the allocation register 601 is full, a new line from an allocation SRAM 605 is dropped into the allocation register 601.

An allocation arbiter 606 arbitrates among buffer requests from all ports, and an allocation counter 607 counts the number of buffers allocated to a specific port and the number of the total allocated buffers. When an allocation is done, the relevant port buffer counter and the total buffer counter are incremented upon a request from the allocation state machine 602, and when a clear operation is done, the counters are decremented upon a request from the buffer management state machine 604.

A line indication 608 indicates in which address of the allocation SRAM 605 there are empty buffers. When there is a write operation to the allocation SRAM 605, the specific address is marked as full in the line indication 608. When there is a clear operation to a buffer in the allocation SRAM 605, the related address is marked as empty in the line indication 608. Thus, the next empty line of the allocation SRAM 605 can be located and dropped to the allocation register 601 for new allocations. A clear map bit module 609 clears bits in the allocation SRAM 605.

A reclaim SRAM 610 is an SRAM in parallel with the allocation SRAM 605. A clear reclaim map bit module 611 clears bits in the reclaim SRAM 610 corresponding to a clear operation to the allocation SRAM 605 during a reclaim process. A reclaim trigger 611 starts the reclaim process. The reclaim mechanism works only when there are stuck buffers because of a bug in the design.

The buffer management system shown in FIG. 6 can be used in any device which needs to temporarily store an incoming packet until decisions about the packet are made. Such devices include packet switcher and elements thereof, including various kinds of switch fabrics.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for finding a next free bit in a register having N bits and a current pointer pointing to one of the bits, the method comprising:
   breaking the N bits of a check vector in the register into M parts, wherein N and M are integers and 1<M<N; and
   selecting with a port selector an available part that has a free bit;
   wherein the available part is a first part, having a free bit, to the left of the part pointed to by the current pointer; and
   wherein the step for selecting the available part comprises:
   breaking the current pointer into upper bits and lower bits, wherein the current pointer has X bits, the upper bits have Y bits and a value U, and the lower bits have X-Y bits and a value L, and wherein $0 \leq U \leq 2^Y-1$, and $0 \leq L \leq 2^{X-Y}-1$, where all of X, Y, U, and L are integers;
   creating a check sector, wherein each bit of the check sector results from performing an AND operation to all bits of a corresponding part of the M parts;

obtaining an add vector by setting its bit number U;
adding the add vector to the check sector to obtain a sum; and
multiplying the sum with an inverse of the check sector.

2. A method for finding a next free bit in a register having N bits and a current pointer pointing to one of the bits, the method comprising:
breaking the N bits of a check vector in the register into M parts, wherein N and M are integers and 1<M<N; and
selecting with a port selector an available part that has a free bit;
wherein the available part is a first part, having a free bit, to the left of the part pointed to by the current pointer;
the method further comprising finding a free bit in the available part; and
wherein the step for finding a free bit comprises:
increasing the available part by 1; and
multiplying the increased available part with an inverse of the available part.

3. A method for finding a next free bit in a register having N bits and a current pointer pointing to one of the bits, the method comprising:
breaking the N bits of a check vector in the register into M parts, wherein N and M are integers and 1<M<N;
selecting with a port selector an available part that has a free bit;
creating a check sector, wherein each bit of the check sector results from performing an AND operation to all bits of a corresponding part of the M parts; and
deciding whether the register has a free bit by performing an AND operation to all bits of the check sector.

4. An apparatus for finding a next free bit in a register having N bits and a current pointer pointing to one of the bits, the apparatus comprising:
a first breaker for breaking the N bits of the check vector in the register into M parts, wherein N and M are integers and 1<M<N; and
a port selector for selecting an available part that has a free bit, wherein the selector selects the available part on the left of the part pointed to by the current pointer;
a first breaker for breaking the N bits of the check vector in the register into M parts, wherein N and M are integers and 1<M<N; and
a check sector generator for generating a check sector, wherein each bit of the check sector results from performing an AND operation to all bits of a corresponding part of the M parts; and
a second breaker for breaking the current pointer into upper bits and lower bits, wherein the current pointer has X bits, the upper bits have Y bits and a value U, and the lower bits have X-Y bits and a value L, and wherein $0 \leq U \leq 2^Y - 1$, and $0 \leq L \leq 2^{X-Y} - 1$, where all of X, Y, U, and L are integers;
wherein the selector comprises:
an add vector generator, setting bit number U of the add vector;
an adder for adding the add vector to the check sector to obtain a sum; and
a multiplier for multiplying the sum with an inverse of the check sector.

5. An apparatus for finding a next free bit in a register having N bits and a current pointer pointing to one of the bits, the apparatus comprising:
a first breaker for breaking the N bits of the check vector in the register into M parts, wherein N and M are integers and 1<M<N;
a port selector for selecting an available part that has a free bit;
a second breaker for breaking the current pointer into upper bits and lower bits, wherein the current pointer has X bits, the upper bits have Y bits and a value U, and the lower bits have X-Y bits and a value L, and wherein $0 \leq U \leq 2^Y - 1$, and $0 \leq L \leq 2^{X-Y} - 1$, where all of X, Y, U, and L are integers; and
a free bit finder, wherein the free bit finder finds a free bit on the left of the bit pointed to by the current pointer;
wherein the free bit finder comprises:
an add vector generator, setting bit number L of the add vector;
an adder for adding the add vector to the available part to obtain a sum; and
a multiplier for multiplying the sum with an inverse of the available part.

6. An apparatus for finding a next free bit in a register having N bits and a current pointer pointing to one of the bits, the apparatus comprising:
a first breaker for breaking the N bits of the check vector in the register into M parts, wherein N and M are integers and 1<M<N;
a port selector for selecting an available part that has a free bit; and
a free bit finder, wherein the free bit finder finds a free bit from the beginning of the available part;
wherein the free bit finder comprises:
an adder for increasing the available part by 1; and
a multiplier for multiplying the increased available part with an inverse of the available part.

7. An apparatus for finding a next free bit in a register having N bits and a current pointer pointing to one of the bits, the apparatus comprising:
a first breaker for breaking the N bits of the check vector in the register into M parts, wherein N and M are integers and 1<M<N;
a port selector for selecting an available part that has a free bit;
a check sector generator for generating a check sector, wherein each bit of the check sector results from performing an AND operation to all bits of a corresponding part of the M parts; and
a register status unit for performing an AND operation to all bits of the check sector.

8. The apparatus according to claim 7, further comprising:
a next vector generator for generating the next vector with the found free bit masked.

9. An apparatus for finding a next free bit in a register having N bits and a current pointer pointing to one of the bits, the apparatus comprising:
means for breaking the N bits of the check vector in the register into M parts, wherein N and M are integers and 1<M<N; and
means for selecting an available part that has a free bit;
a second means for breaking the current pointer into upper bits and lower bits, wherein the current pointer has X bits, the upper bits have Y bits and a value U, and the lower bits have X-Y bits and a value L, and wherein $0 \leq U \leq 2^Y - 1$, and $0 \leq L \leq 2^{X-Y} - 1$, where all of X, Y, U, and L are integers; and
means for finding the free bit, wherein the free bit finding means finds the free bit on the left of the bit pointed to by the current pointer;
wherein the free bit finding means comprises:
means for generating an add vector, setting bit number L of the add vector;

means for adding the add vector to the available part to obtain a sum; and means for multiplying the sum with an inverse of the available part.

10. The apparatus according to claim 9, wherein the selecting means selects the available part on the left of the part pointed to by the current pointer.

11. An apparatus for finding a next free bit in a register having N bits and a current pointer pointing to one of the bits, the apparatus comprising:

means for breaking the N bits of the check vector in the register into M parts, wherein N and M are integers and 1<M<N; and means for selecting an available part that has a free bit; and means for finding the free bit, wherein the free bit finding means finds the free bit from the beginning of the available part;

wherein the free bit finding means comprises:

means for increasing the available part by 1; and means for multiplying the increased available part with an inverse of the available part.

12. The apparatus according to claim 11, further comprising:

means for generating a check sector, wherein each bit of the check sector results from performing an AND operation to all bits of a corresponding part of the M parts.

13. An apparatus for finding a next free bit in a register having N bits and a current pointer pointing to one of the bits, the apparatus comprising:

means for breaking the N bits of the check vector in the register into M parts, wherein N and M are integers and 1<M<N;

means for selecting an available part that has a free bit;

means for generating a check sector, wherein each bit of the check sector results from performing an AND operation to all bits of a corresponding part of the M parts; and means for performing an AND operation to all bits of the check sector.

14. The apparatus according to claim 13, further comprising:

means for generating the next vector with the found free bit masked.

* * * * *

UNITED STATES PATENT AND TRADEMARK OFFICE
CERTIFICATE OF CORRECTION

PATENT NO. : 7,593,976 B1  Page 1 of 1
APPLICATION NO. : 10/678523
DATED : September 22, 2009
INVENTOR(S) : Sorel Horovitz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1593 days.

Signed and Sealed this

Twenty-eighth Day of September, 2010

David J. Kappos
*Director of the United States Patent and Trademark Office*